United States Patent [19]

Okazaki et al.

[11] Patent Number: 5,262,707

[45] Date of Patent: Nov. 16, 1993

[54] POSITIONING CONTROL METHOD AND APPARATUS

[75] Inventors: Yuichi Okazaki, Tsukuba; Shin Asano; Takayuki Goto, both of Yokohama, all of Japan

[73] Assignees: Mitsubishi Jukogyo Kabushiki Kaisha; Agency of Industrial Science and Technology, both of Tokyo, Japan; a part interest

[21] Appl. No.: 888,119

[22] Filed: May 26, 1992

[30] Foreign Application Priority Data

May 24, 1991 [JP] Japan ................ 3-120034

[51] Int. Cl.⁵ ............................. G05B 11/18
[52] U.S. Cl. ................... 318/592; 318/590; 318/615; 318/593
[58] Field of Search ............ 318/590, 592, 615, 593; 364/182

[56] References Cited

U.S. PATENT DOCUMENTS 3,449,754 10/1969 Stutz .
4,225,928 9/1980 Ohkubo ...................... 364/474
4,345,192 8/1982 Kohzai et al. ............... 318/592
4,922,175 5/1990 Sugiura et al. .............. 318/592

FOREIGN PATENT DOCUMENTS 0401018 5/1990 European Pat. Off. .
2201532 1/1988 United Kingdom .

OTHER PUBLICATIONS

Patent Abstracts of Japan, vol. 9, No. 311 (M-436) (2034) Dec. 7, 1985 & JP-A-60 146 650 (Toshiba Kikai K.K.) Aug. 2, 1985; Abstract.
Proceedings of the 1988 American Control Conference, vol. 1, Jun. 15, 1988 pp. 127-132; Staroselsky et al., "Two-Stage Actuation . . . "

Primary Examiner—William M. Shoop, Jr.
Assistant Examiner—Karen Masih
Attorney, Agent, or Firm—Jacobson, Price, Holman & Stern

[57] ABSTRACT

A positioning control method and apparatus in which a fine movement mechanism is moved without exceeding a movable area so that positioning of a large amount of displacement can be attained with high accuracy and high-speed positioning from a point to a point with the same control method. A coarse movement mechanism (101) has a large amount of movement and low positioning accuracy and a fine movement mechanism (102) on the coarse movement mechanism has a small amount of movement and high positioning accuracy. A signal E4 based on a error signal C4 of a movement command signal A4 of a signal generator (104) and a displacement signal B4 representative of a displacement of an object to be positioned with respect to a fixed position detected by an absolute position detecting device (105) is supplied to the fine movement mechanism and a coarse movement command signal M4, produced by adding a signal representative of a relative displacement of the fine movement mechanism (102) with respect to the coarse movement mechanism (101) detected by a relative position detecting device (133) to the error signal C4, is supplied to the coarse movement mechanism (101) to thereby control respective movements.

4 Claims, 8 Drawing Sheets

POSITIONING CONTROL METHOD AND APPARATUS

BACKGROUND OF THE INVENTION

The present invention relates to a positioning control method and apparatus for use in a movement apparatus for effecting positioning with high accuracy for a large amount of movement.

FIGS. 8, 9 and 10 are block diagrams of a conventional positioning control method of a positioning apparatus for a large amount of movement with high accuracy in combination with a coarse movement mechanism and a fine movement mechanism.

In the conventional positioning control method of FIG. 8, a coarse movement mechanism 1 is moved with respect to an apparatus and a fine movement mechanism 2 is moved with respect to the coarse movement mechanism 1.

The coarse movement mechanism 1 has low positioning accuracy but can be moved in a wide area, while the fine movement mechanism 2 can be moved in a narrow area with high positioning accuracy.

When it is assumed that an absolute displacement of a reference point of the coarse movement mechanism 1 with respect to a fixed point of the apparatus is a displacement F and a relative displacement of the fine movement mechanism 2 with respect to the reference point of the coarse movement mechanism 1 is a displacement G, a displacement H of an object on the fine movement mechanism 2 with respect to the fixed point of the apparatus is a sum of G and F.

A signal generator 4 constituted by a computer or the like prepares a movement command A for designating a position of the object on the fine movement mechanism 2 with respect to the fixed point of the apparatus.

The displacement H of the object on the fine movement apparatus 2 with respect to the fixed point of the mechanism is detected as a displacement B by position detecting means 5 such as, for example, a laser measuring device or the like.

A difference signal C which is equal to a value obtained by subtracting the displacement B from the movement command A is supplied to the coarse movement mechanism 1 and the fine movement mechanism 2 through input switching means 3.

In brief, in the positioning control method shown in FIG. 8, the movement command A is prepared by the signal generator 4 constituted by a computer or a signal generator. The absolute displacement H of the object to be positioned with respect to the fixed position which is a sum of the relative displacement G of the fine movement mechanism 2 with respect to the coarse movement mechanism 1 and the absolute displacement F of the coarse movement mechanism 1 with respect to the fixed point is detected as the displacement B by means of the position detecting means such as, for example, a laser measuring device or the like. The difference signal C between the movement command A and the displacement B is supplied to the input switching means 3 constituted by a computer or an analog circuit, for example.

When the difference signal C is larger as compared with a movable area of the fine movement mechanism 2, the input switching means is connected to a and a coarse movement command signal D is supplied to the coarse movement mechanism 1. The coarse movement mechanism 1 is controlled to be moved within the movable area of the fine movement mechanism by means of the difference signal C. When the difference signal C falls within the movable area of the fine movement mechanism 2, the input switching means 3 is connected to b and a fine movement command signal E is supplied to the fine movement mechanism 2. By moving the fine movement mechanism 2 so that the difference signal C is substantially equal to zero, the absolute displacement H of the object to be positioned with respect to the fixed position is caused to coincide with the movement command signal A.

A conventional positioning control method shown in FIG. 9 controls a coarse movement mechanism and a fine movement mechanism having the same configuration as that of the positioning control method of FIG. 8.

When it is assumed that an absolute displacement of a reference point of a coarse movement mechanism 11 with respect to a fixed point of an apparatus is a displacement F1 and a relative displacement of a reference of a fine movement mechanism 12 with respect to the reference point of the coarse movement mechanism 11 is a displacement G1, a displacement H1 of an object on the fine movement mechanism 12 with respect to the fixed point of the apparatus is a sum of G1 and F1.

A signal generator 14 constituted by a computer or the like prepares a movement command A1 for designating a position of the object on the fine movement mechanism 12 with respect to the fixed point of the apparatus.

A displacement H1 of the object on the fine movement mechanism 12 with respect to the fixed point of the apparatus is detected as a displacement B1 by means of position detecting means 15 such as, for example, a laser measuring device or the like.

An error signal C1 equal to a value obtained by subtracting the displacement B1 from the movement command A1 is supplied to the coarse movement mechanism 11 and the fine movement mechanism 12 through a compensation circuit 16, a limiter circuit 17 and a insensitive band circuit 18.

In brief, in the positioning control method shown in FIG. 9, the movement command signal A1 is prepared by the signal generator 14. The absolute displacement H1 of the object to be positioned with respect to the fixed position which is equal to a sum of the absolute displacement G1 of the fine movement mechanism 12 with respect to the coarse movement mechanism 11 and the absolute displacement F1 of the coarse movement mechanism 11 with respect to the fixed position is detected as the displacement B1 by means of the position detecting means 15. The difference signal C1 between the movement command A1 and the displacement B1 is supplied to the compensation circuit 16 for compensating a gain characteristic and a phase characteristic of the object to be positioned to thereby obtain a compensation error signal J1. The compensation error signal J1 is supplied to the coarse movement mechanism 11 and the fine movement mechanism 12 simultaneously. The compensation error signal J1 supplied to the fine movement mechanism 12 passes through the limiter 17 and the compensation error signal J1 supplied to the coarse movement mechanism 11 passes through the insensitive band circuit 18.

The fine movement mechanism 12 responds to a specific error area of $-\alpha$ to $\alpha$ within the movable area of the fine movement mechanism 12 and the coarse movement mechanism 11 responds to the outside of the error area or the external area larger than $\alpha$ and smaller than −α. The limiter 17 produces an output signal proportional to an input signal when the input signal is within the specific error area and produces an output signal having a fixed value when the input signal is outside of the specific command area. The insensitive circuit 18 does not produce any output signal when an input signal is smaller than a specific value command α or greater than −α and produces an output signal proportional to a difference of the input signal and the specific value command α when the input signal is not smaller than the specific value command α, and produces an output signal proportional to the difference of the input signal and the specific value −α when the input signal is not greater than the specific value −α.

When the command signal C1 is outside of the specific command area, the coarse movement mechanism 11 is moved a long distance, and when the command signal C1 comes within the specific command area, the fine movement mechanisms 12 is moved so that the signal C1 is substantially equal to zero. Accordingly, the absolute displacement H1 of the object to be positioned with respect to the fixed position substantially coincides with the movement command signal A1 to effect the positioning (refer to Nakagawa, Torii and Kubota; "Development of Combined Fine and Coarse Movement Super-Precision Servo Technique—Trial Manufacture and Estimation", 1990, Collected Treatises of Lectures of Autumn Scientific Lecture Meeting of The Japan Society for Precision Engineering, pp. 1055).

In a conventional control of FIG. 10, a coarse movement mechanism 21 is moved with respect to a fixed point of an apparatus and a fine movement mechanism 22 is moved with respect to the coarse movement mechanism 21.

The fine movement mechanism 22 and the coarse movement mechanism 21 include measuring devices 25a and 25b for measuring displacement with respect to the fixed point of the apparatus, respectively.

In the positioning control method shown in FIG. 10, a signal generator 24 supplies to the fine movement mechanism 22 a fine movement command signal A3 having a fine movement step hm as a resolution as shown in FIG. 11 as a movement command signal. Further, the signal generator 24 supplies to the coarse movement mechanism 21 a coarse movement command signal A2 for generating a coarse movement step hc (=3×hm) as a movement command signal as shown in FIG. 12 each time three fine movement steps hm of FIG. 11 are generated.

The coarse movement command signal A2 to the coarse movement mechanism 21 is not produced until time t1 that the fine movement steps hm of the fine movement command signal A3 are generated three times and the coarse movement mechanism is not moved. On the contrary, the fine movement mechanism 22 is moved in response to the fine movement command signal A3 as follows. An error signal C3 obtained by subtracting a displacement signal B3 produced from the position detecting means 25a for detecting an absolute displacement value H2 with respect to the fixed point of the apparatus of the object on the fine movement mechanism 22 from the fine movement command signal A3 is supplied to a compensation circuit 29 constituted by a computer or an analog circuit for compensating a gain characteristic and a phase characteristic of the object to be positioned. The fine movement mechanism 22 receives fine movement compensation command signal E2 produced by the compensation circuit 29 and is moved to be substantially coincident with the fine movement command signal A3.

When the fine movement steps hm for the fine movement command signal A3 are generated three times and the time t1 comes, the coarse movement command signal A2 generates a coarse movement step corresponding to three time the fine movement steps hm. An error signal C2 obtained by subtracting from the coarse movement command signal A2 a displacement signal B2 produced by the position detecting means 25b for detecting the absolute displacement value of the coarse movement mechanism with respect to the fixed position is supplied to the compensation circuit C2. The coarse movement mechanism 21 receives a coarse displacement compensation command signal D2 and is moved to be coincident with the coarse movement command signal A2.

On the other hand, the fine movement mechanism 22 continues the same movement as that made until the time t1. Accordingly, movement value G2 of the fine movement mechanism at the time t1 is G2=3 hm, and movement value F2 of the coarse movement mechanism is F2=hc=3 hm.

Accordingly, the absolute displacement value H2 of the object to be positioned with respect to the fixed position is H2=F2+G2=6hm. At this time, the displacement signal B3 produced by the position detecting means 25 is subtracted from the fine movement command signal A3. Accordingly, the fine movement mechanism 22 is supplied with error signal C3=A3−B3=3 hm−6 hm=−F3 and is moved back by the movement value F2 of the coarse movement mechanism.

The positioning control method shown in FIG. 10 performs the above operations repeatedly to perform positioning over a long distance with high accuracy (refer to Sakuta, Ogawa and Ueda; "Study Concerning Super-Precision Position Control-Interlocked Control of Coarse and Fine Movement", Collected Treatises of Lectures of Spring Scientific Lecture Meeting of The Japan Society for Precision Engineering, 1990, pp. 795, and Sakuta, Ogawa and Ueda; "Position Control by Interlocked Coarse and Fine Movement", Collected Treatises of Lectures of Spring Scientific Lecture Meeting of The Japan Society for Precision Engineering, 1991, pp. 229).

In order to perform continuous control in which an object to be positioned traces the locus to be targeted with high accuracy over a long distance, a positioning apparatus including a coarse movement mechanism having a large amount of movement and low positioning accuracy and a fine movement mechanism having a small amount of movement and high positioning accuracy and on which an object to be positioned is mounted is employed. In this case, a movement command having accuracy corresponding to that of the fine movement mechanism is inputted.

Since the input to the fine movement mechanism 2 and the coarse movement mechanism 1 is switched by the input switching means 3 in accordance with a magnitude of the error signal C in the controller shown in FIG. 8, the absolute displacement value H of the object to be positioned with the fixed position is substantially coincident with the movement command signal A when the fine movement mechanism 2 is within the movable area. However, when the fine movement mechanism 22 is moved to the movable area, the error signal C is increased gradually since the fine movement mechanism 2 can not be moved. When the error signal C reaches a magnitude in which the input switching means 3 is switched to the coarse movement mechanism 1, the coarse movement mechanism 1 is moved in response to the error signal C.

Accordingly, in the continuous positioning control, since the fine movement mechanism 2 can not be moved and only the coarse movement mechanism 1 is moved in accordance with the above procedure, the continous positioning control with high accuracy is not attained.

Further, in the positioning control method of FIG. 9, the compensation command signal J1 obtained by supplying the command signal C1 to the compensation circuit 16 is selectively supplied to the limiter 17 or the insensitive band circuit 18 in accordance with the magnitude of the compensation command signal J1 to produce the fine movement compensation command signal E1 or the coarse movement compensation command signal D1.

At this time, as described above, when the continuous positioning control with high accuracy is made, since the movement command signal A1 is inputted with accuracy corresponding to that of the fine movement mechanism 12, the fine movement mechanism 12 is moved to the movable area of the fine movement mechanism 12 and the absolute displacement amount H1 of the object to be positioned is substantially coincident with the movement command signal A1. However, when the movement command signal A1 is a command signal so that the movable area of the fine movement mechanism 12 is exceeded, the fine movement mechanism 12 can not be moved although the compensation command signal J1 is supplied to the fine movement mechanism 12. Thus, since the command signal C1 is increased gradually, the compensation command signal J1 is also increased. When the compensation difference signal J1 exceeds the difference area of $-\alpha$ to $\alpha$ set by the limiter 17 and the insensitive band circuit 18, the compensation command signal J1 is supplied to the coarse movement mechanism 11 and the coarse movement mechanism is moved.

Thus, since the fine movement mechanism 12 already exceeds the movable area, the fine movement mechanism 12 can not be moved for the continuous positioning control and only the coarse movement mechanism 11 is moved, so that the continuous positioning control with high accuracy is not attained.

Further, in the positioning control method of FIG. 10, when the continuous positioning control with high accuracy is made, the fine movement command A3 having the fine movement step hm corresponding to the accuracy of the fine movement mechanism 22 is supplied to the fine movement mechanism 22 as shown in FIG. 11. The coarse movement step hc having a resolution or more with which the coarse movement mechanism 21 can be moved and having an integral multiple, for example three times of the fine movement step hm is supplied to the coarse movement mechanism 21 as shown in FIG. 12 at the same time as the time t1 or t2 that the fine movement command signal A3 generates the fine movement steps hm three times.

At this time, as described above, the fine movement mechanism 22 is moved back by the movement amount F2 of the coarse movement mechanism to attain positioning.

Since the coarse movement mechanism 21 generally has low positioning accuracy, a positioning error necessarily occurs in the coarse movement mechanism movement amount F2 for the coarse movement command signal A2. Accordingly, since the fine movement mechanism 22 is moved to correct the positioning error, the positioning error of the coarse movement mechanism is accumulated for each repetition of the above control method. Thus, the movable area of the fine movement mechanism 22 is exceeded and the fine movement mechanism can not be moved. Accordingly, the continuous positioning control with high accuracy can be not be made thereafter.

As described above, even in any positioning central method shown in FIGS. 8 to 10, when the object to be positioned is positioned with high accuracy over a long distance, the fine movement mechanism necessarily exceeds the movable area and can not be moved, so that the positioning with high accuracy can not be made for the continuous movement command signal.

Further, even in any apparatus, it is impossible to control the continuous positioning in a large amount of movement with high accuracy and movement of a point to a point that high-speed movement is made between two points of a starting point of the object to be positioned and a final positioning point to effect positioning to the final positioning point by means of the same control method, and accordingly control methods must be selectively used in accordance with movement to be made.

BRIEF SUMMARY OF THE INVENTION

It is an object of the present invention to be able to move a fine movement mechanism of a movement apparatus including a coarse movement apparatus which is moved with respect to an apparatus and a fine movement apparatus which is moved with respect to the coarse movement apparatus without exceeding a movable area It is another object of the present invention to control positioning in a large amount of movement with high accuracy and high-speed positioning from a point to a point by the same control method.

The above objects are attained by the following positioning control method according to the present invention. The positioning control method in which a movement apparatus including a coarse movement mechanism which is moved with respect to an apparatus and a fine movement mechanism which is moved with respect to the coarse movement mechanism is employed to position an object on the fine movement mechanism in a wide area with high accuracy, is characterized by the provision of generating a movement command for designating a position of the object on the fine movement mechanism by a signal generator, detecting an absolute displacement of the object on the fine movement mechanism with respect to a fixed point of the apparatus by absolute position detecting means, detecting a relative displacement of the fine movement mechanism with respect to the coarse movement mechanism by relative position detecting means, moving the coarse movement mechanism by a difference of an output of the absolute position detecting means and a sum of the movement command from the signal generator and an output of the relative position detecting means, and moving the fine movement mechanism by a difference of the movement command from the signal generator and the output of the absolute position detecting means.

In brief, the positioning control method for controlling a position of an object to be positioned mounted on a fine movement mechanism of a movement apparatus including a coarse movement mechanism having a large amount of movement and low positioning accuracy and the fine movement mechanism having a small amount of movement and high positioning accuracy, is characterized by the provision of adding a relative displacement of the fine movement mechanism with respect to the coarse movement mechanism to a difference signal which is a difference of a displacement signal representative of a displacement of the object to be positioned with respect to a fixed position and a displacement command signal to generate a coarse movement command signal, supplying the coarse movement command signal to the coarse movement mechanism, and supplying the difference signal to the fine movement mechanism.

Further, the above objects are attained by the following positioning controller according to the present invention.

The positioning controller employing a movement apparatus including a coarse movement mechanism which is moved with respect to an apparatus and a fine movement mechanism which is moved with respect to the coarse movement mechanism to position an object on the fine movement mechanism in a wide area with high accuracy, is characterized by the provision of a signal generator for generating a movement command for designating a position of the object on the fine movement mechanism, an absolute position detecting means for detecting an absolute displacement of the object on the fine movement mechanism with respect to a fixed point of the apparatus, a relative position detecting means for detecting a relative displacement of the fine movement mechanism with respect to the coarse movement mechanism, a subtraction circuit for generating a difference signal of the movement command and an output of the absolute position detecting means, and an adder for adding an output of the relative position detecting means to the difference signal, whereby the coarse movement mechanism is controlled by an output of the adder circuit and the fine movement mechanism is controlled by an output of the subtraction circuit.

In brief, the positioning controller for controlling a position of an object to be positioned mounted on a fine movement mechanism of a movement apparatus including a coarse movement mechanism having a large amount of movement and low positioning accuracy and the fine movement mechanism having a small amount of movement and high positioning accuracy, is characterized by the provision of:

a signal generator for generating a movement command signal of the object to be positioned;

absolute position detecting means for detecting an absolute position of the object to be positioned with respect to the fixed position to send a displacement signal representative of a displacement amount at this time;

relative position detecting means for detecting a relative displacement of the fine movement mechanism with respect to the coarse movement mechanism;

the fine movement mechanism being controlled on the basis of a difference signal representative of a difference of the movement command signal and the displacement signal; and the coarse movement mechanism being controlled on the basis of a coarse movement command signal obtained by adding an output signal of the relative position detecting means to the difference signal.

The relative displacement of the fine movement mechanism with respect to the coarse movement mechanism is detected by the relative position detecting means. The coarse movement mechanism is moved in accordance with the coarse movement command signal obtained by adding the difference signal to the relative displacement. The coarse movement mechanism is moved while always observing the movement amount of the fine movement mechanism. When the fine movement mechanism reaches a specific movement amount, since the coarse movement mechanism is moved by a movement amount substantially corresponding to that of the fine movement mechanism, the fine movement mechanism is moved back by the movement amount of the coarse movement mechanism. The fine movement mechanism is moved to compensate a difference of the movement command signal and the displacement amount of the object to be positioned occurring by movement of the coarse movement mechanism with respect to the fixed position. Accordingly, positioning can always be attained with high accuracy.

By repeating the above operation, a large amount of movement can be made with high accuracy while always maintaining the fine movement mechanism within the movable area.

BRIEF DESCRIPTION OF THE DRAWINGS

Embodiments of the invention will now be described in detail with reference to the accompanying drawings wherein.

DETAILED DESCRIPTION OF THE PREFERRED EMBODIMENTS

Figure 1:
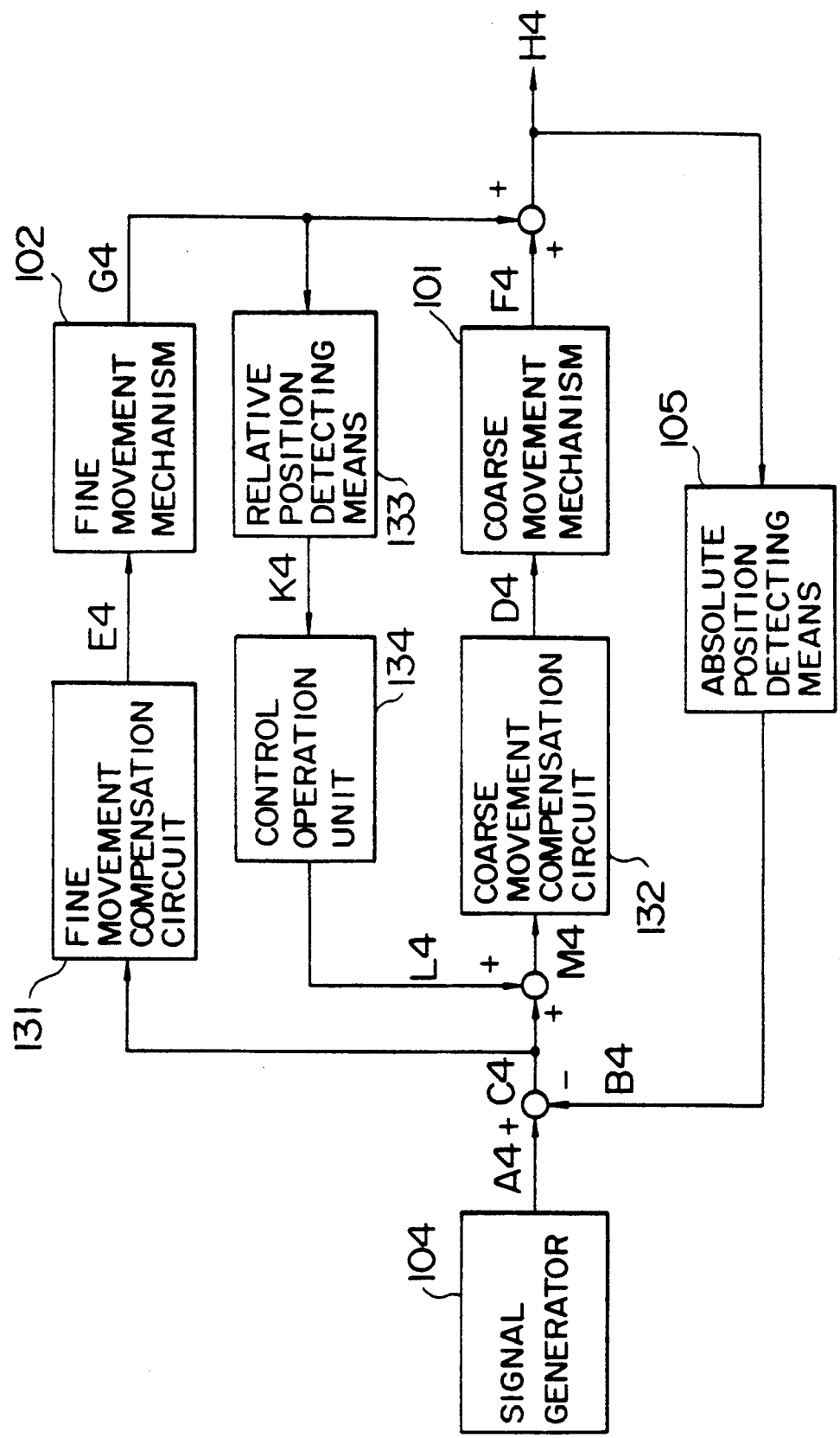
FIG. 1 is a block diagram of a first embodiment of the present invention.

FIG. 1 is a block diagram showing a first embodiment of the present invention.

A coarse movement mechanism 101 uses as its driving source an actuator such as, for example, a DC servo motor or a stepping motor and uses as its guide element, for example, rolling guide or sliding guide. The coarse movement mechanism 101 responds relatively slowly and with low positioning accuracy but travels over the long distance.

A fine movement mechanism 102 uses as its driving source an actuator such as, for example, a piezoelectric element or a magnetostrictive element having high-speed response, high positioning resolution and large force generation capability and uses as its guide element, for example, a hinged spring or a leaf spring. The fine movement mechanism 102 has high speed response capability and high positioning accuracy but has a small movement amount such as about several tens μm.

A signal generator 104 generates a movement command signal A4 for an object to be positioned. The generator is constituted by a computer or an analog circuit.

An absolute position detecting means 105 is a sensor formed by, for example, a laser interferometer and detects an absolute displacement H4 which is a displacement of an object to be positioned on the fine movement mechanism with respect to a fixed point of the apparatus to produce the displacement amount of the object at this time as a displacement signal B4.

Relative position detecting means 133 is a sensor formed by, for example, a capacitance type displacement measuring device and detects a relative displacement of the fine movement mechanism 102 with respect to the coarse movement mechanism 101 to supply its output signal K4 to a control operation unit 134.

The control operation unit 134 is constituted by, for example, an integrator and adjusts a gain and a frequency characteristic to produce an output signal L4.

The displacement signal B4 is subtracted from the movement command signal A4 to prepare an error signal C4, which is supplied to a fine movement compensation circuit 131 and a coarse movement compensation circuit 132.

The fine movement compensation circuit 131 and the coarse movement compensation circuit 132 are to be configured as constant gain components or low-pass filters depending on the types of the fine movement mechanism 102 and the coarse movement mechanism 101, respectively.

The output signal L4 of the control operation unit 134 based on the output signal K4 from the relative position detecting means 133 for detecting the relative displacement of the fine movement mechanism 102 with respect to the coarse movement mechanism 101 is added to the error signal C4 supplied to the coarse movement compensation circuit 132 to prepare a coarse movement command signal M4 (=C4+L4). Thereafter, the coarse movement command signal M4 is changed to a coarse movement compensation command signal D4 through the coarse movement compensation circuit 132.

The coarse movement compensation circuit 132 prepares the coarse movement compensation command signal D4 on the basis of the coarse movement command signal M4 prepared by adding the output signal L4 based on the relative displacement signal K4 to the error signal C4 which is a difference of the movement command signal A4 and the displacement signal B4.

The coarse movement mechanism 101 is moved by the coarse displacement F4 with respect to the apparatus on the basis of the coarse movement command signal D4 produced by the coarse movement compensation circuit 132.

On the other hand, the error signal C4 supplied to the fine movement compensation circuit 131 is changed to a fine movement compensation command signal E4 by means of the fine movement compensation circuit 131.

The fine movement compensation circuit 131 produces the fine movement compensation command signal E4 on the basis of the error signal C4.

The fine movement mechanism 102 is moved by the fine displacement on the basis of the fine movement compensation command signal E4 produced by the fine movement compensation circuit 131. The fine displacement is a relative displacement G4. Thus, the coarse movement mechanism 101 and the fine movement mechanism 102 are moved by the coarse displacement F4 and the fine displacement G4 in response to the coarse movement compensation command signal D4 and the fine movement compensation command signal E4.

The coarse movement mechanism is to be moved always by the coarse displacement F4 to coincide with the movement command signal A4 in response to the coarse movement compensation signal D4. However, since the coarse movement mechanism 101 has low accuracy, the coarse movement mechanism 101 can not reduce the difference signal C4 between the movement command signal A4 and the displacement signal B4 to zero. In order to reduce the left difference to zero, the fine movement mechanism 102 is moved by the fine movement amount G4. Consequently, the absolute displacement amount H4 of the object to be positioned with respect to the fixed position is H4=F4+G4.

The absolute displacement amount H4 is detected by the absolute position detecting means 105 again. The displacement signal B4 detected at this time is subtracted from the movement command signal A4 of the signal generator 104 to prepare the difference signal C4, so that the closed feedback control is attained. Consequently, positioning in large amount of movement with high accuracy is attained.

The fine displacement amount G4 accumulated by movement of the fine movement mechanism 102 is detected by the relative position detecting means as a relative displacement of the fine movement mechanism 102 and the coarse movement mechanism 101. An output signal K4 of the relative position detecting means 133 is supplied to the control operation unit 134, which produces output signal L4, and the output signal L4 is added to the error signal C4 to produce the coarse movement command signal M4, which is supplied to the coarse movement compensation circuit 132. The coarse movement mechanism 101 is moved by the coarse movement compensation command signal D4. In this manner, the coarse movement mechanism 101 always monitors the fine movement amount G4. Thus, when the fine movement mechanism 102 is moved to a specific displacement, the coarse movement mechanism is moved so that the fine movement mechanism 102 can always be moved within a specific area.

The movable area of the fine movement mechanism 102 is set by gain adjustment of the control operation unit 132. Thus, the fine movement mechanism can always be moved within the movable area.

Figure 2:
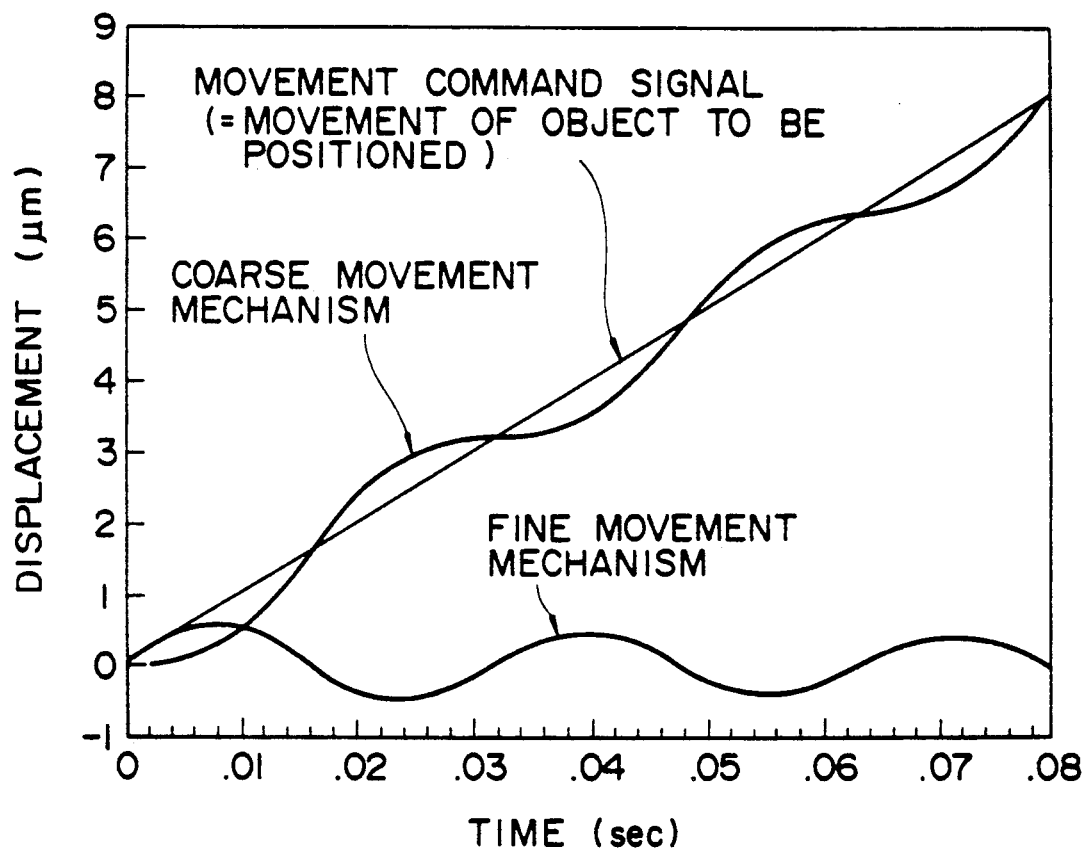
FIG. 2 is a graph showing a movement characteristic of a coarse movement mechanism and a fine movement mechanism with respect to a movement command signal of the embodiment shown in FIG. 1.

FIG. 2 is a characteristic diagram showing displacements of the coarse movement mechanism 101 and the fine movement mechanism 102 when a stepwise movement command signal A4 having accuracy of 5 nm is inputted. Referring to FIG. 2, it would be understood that the coarse movement mechanism 101 is moved not to exceed the movable area of the fine movement mechanism 102 and the fine movement mechanism 102 corrects an error of the coarse movement mechanism 101.

Figure 3:
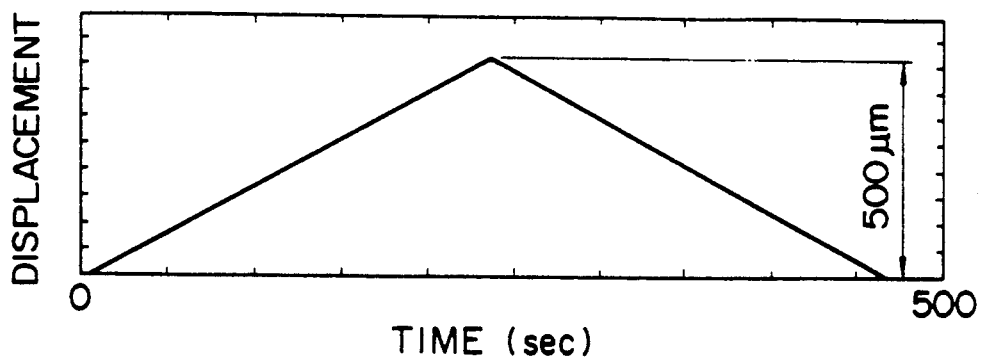
FIG. 3 is a graph showing a positioning characteristic (an absolute movement to a movement command signal when going and returning a distance of 500 μm at steps of 5 nm) of the embodiment shown in FIG. 1.
Figure 4:
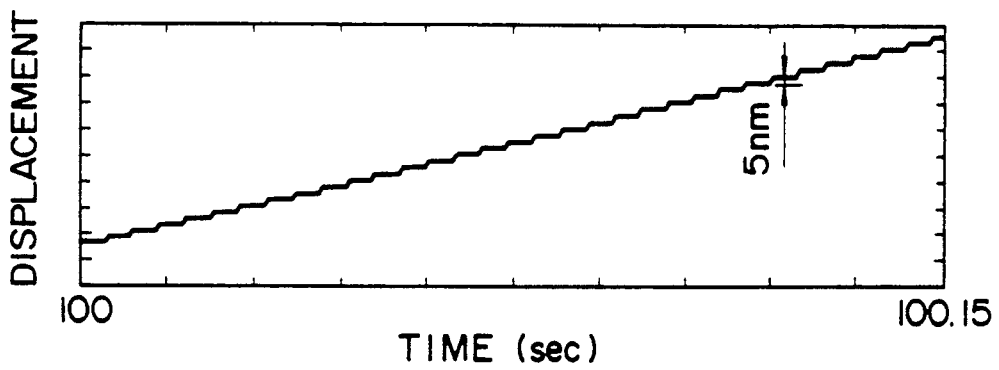
FIG. 4 is a graph showing an extracted and enlarged portion of FIG. 3.

FIG. 3 is a graph showing the absolute displacement amount H4 of the object to be positioned with respect to the fixed point when the signal for going and returning a distance of 500 μm by steps of 5 nm is applied as the movement command signal A4. FIG. 4 is a graph showing an enlarged portion of FIG. 3. As shown in FIGS. 3 and 4, it would be understood that the object to be positioned is moved over the area of 500 μm by steps of 5 nm without the fact that the fine movement mechanism 102 exceeds the movable area.

Figure 5:
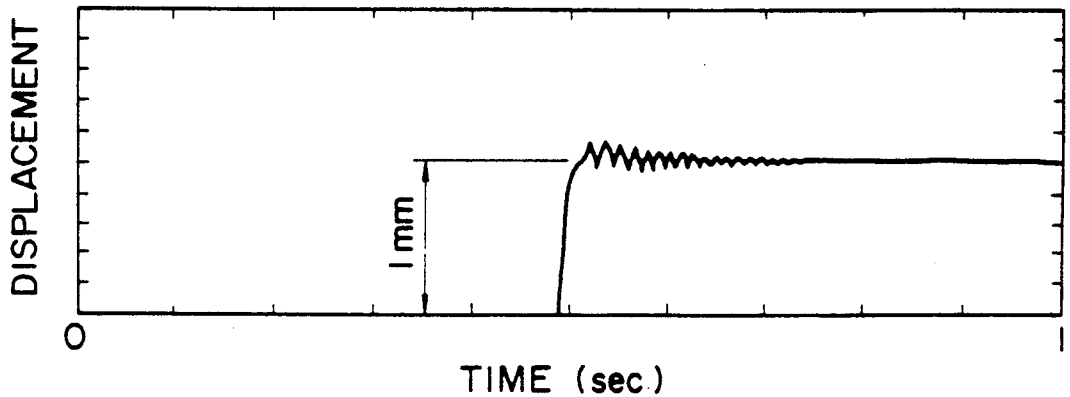
FIG. 5 is a graph showing a movement characteristic of an object to be positioned (movement of the object to be positioned with respect to the movement command signal having a step of 1 mm) in the embodiment shown in FIG. 1.

FIG. 5 is a graph showing movement of the object to be positioned when the stepwise movement command of 1 mm is applied. It would be understood from FIG. 5 that although residual oscillation is left, the object to be positioned can be moved to coincide with the movement command signal A4 for movement for a long distance from a point to a point.

Figure 6:
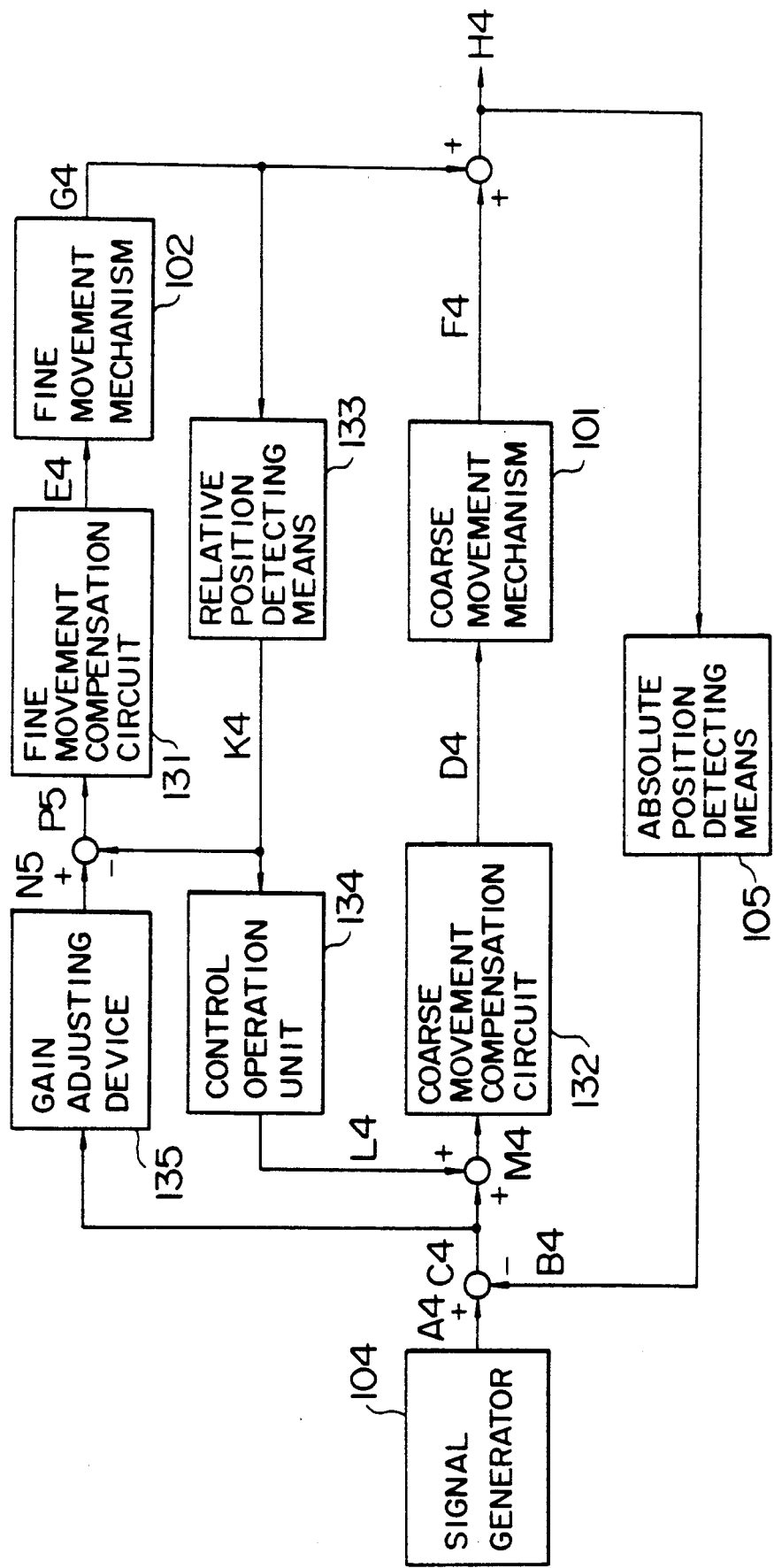
FIG. 6 is a block diagram showing a second embodiment of the present invention.

FIG. 6 is a block diagram showing a second embodiment of the present invention. This embodiment is an improvement of the embodiment of FIG. 1.

In the embodiment of FIG. 6, the output signal K4 of the relative position detecting means 133 is subtracted from an output signal N5 of a gain adjusting device 135 for adjusting a gain of the difference signal C5 to produce a difference signal P5, which is supplied to the fine movement compensation circuit 131. Other configuration is the same as that of the first embodiment shown in FIG. 1. The same elements as those of FIG. 1 are given the same numerals and duplicate description is omitted.

The output signal G4 of the fine movement mechanism 102 is fed back to the input of the fine movement compensation circuit 131 through the relative position detecting means 133. Accordingly, the transient response of the fine movement mechanism is improved.

According to the embodiment, the moving speed of the object to be positioned for the movement command signal A4 for going and returning a distance of 500 μm with accuracy of 5 nm can be improved about five times as compared with the first embodiment.

Figure 7:
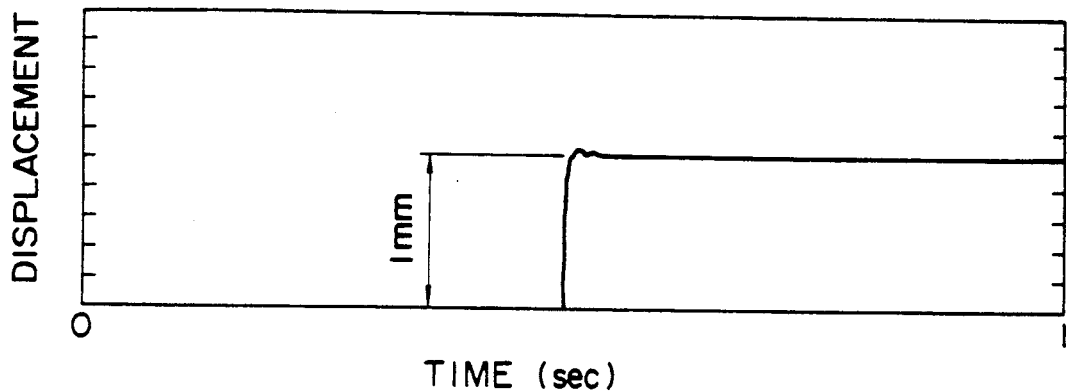
FIG. 7 is a graph showing a movement characteristic similar to that of FIG. 5 of the object to be positioned in the embodiment shown in FIG. 6.
Figure 8:
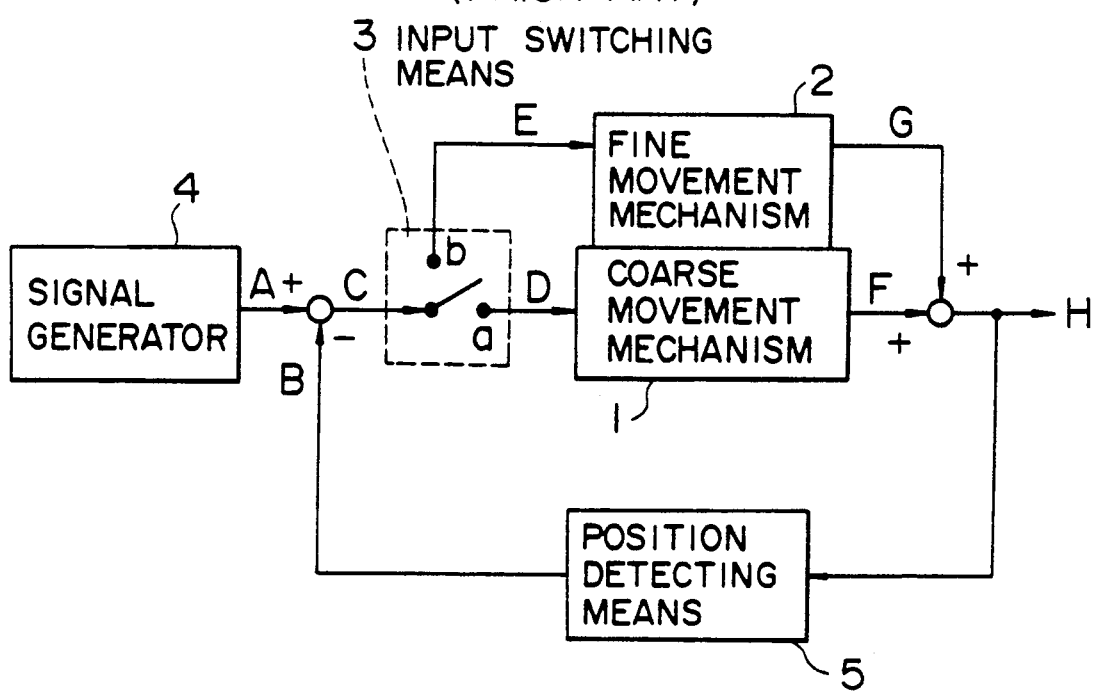
FIG. 8 is a block diagram showing a first conventional positioning control method.
Figure 9:
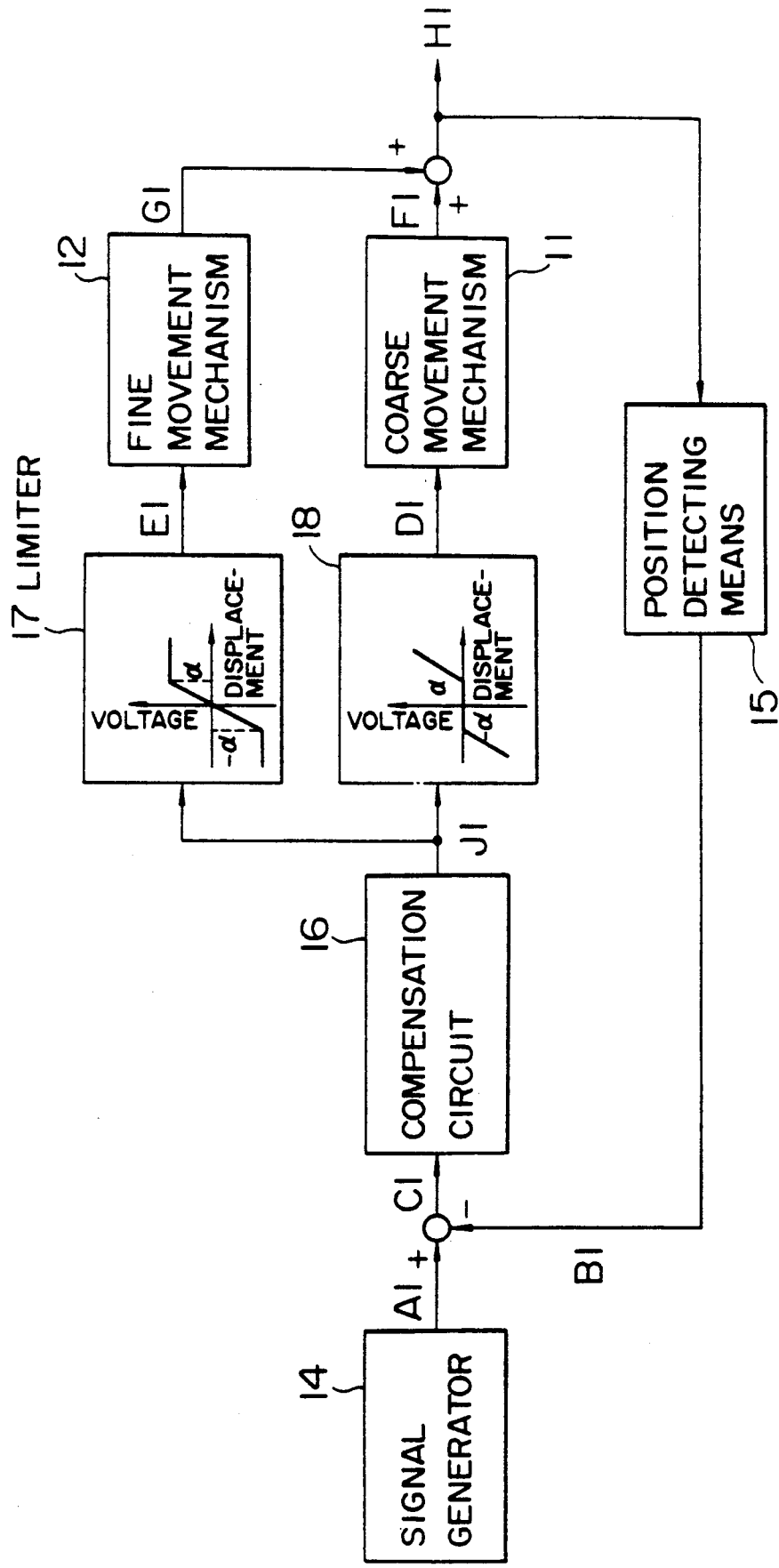
FIG. 9 is a block diagram showing a second conventional positioning control method.
Figure 10:
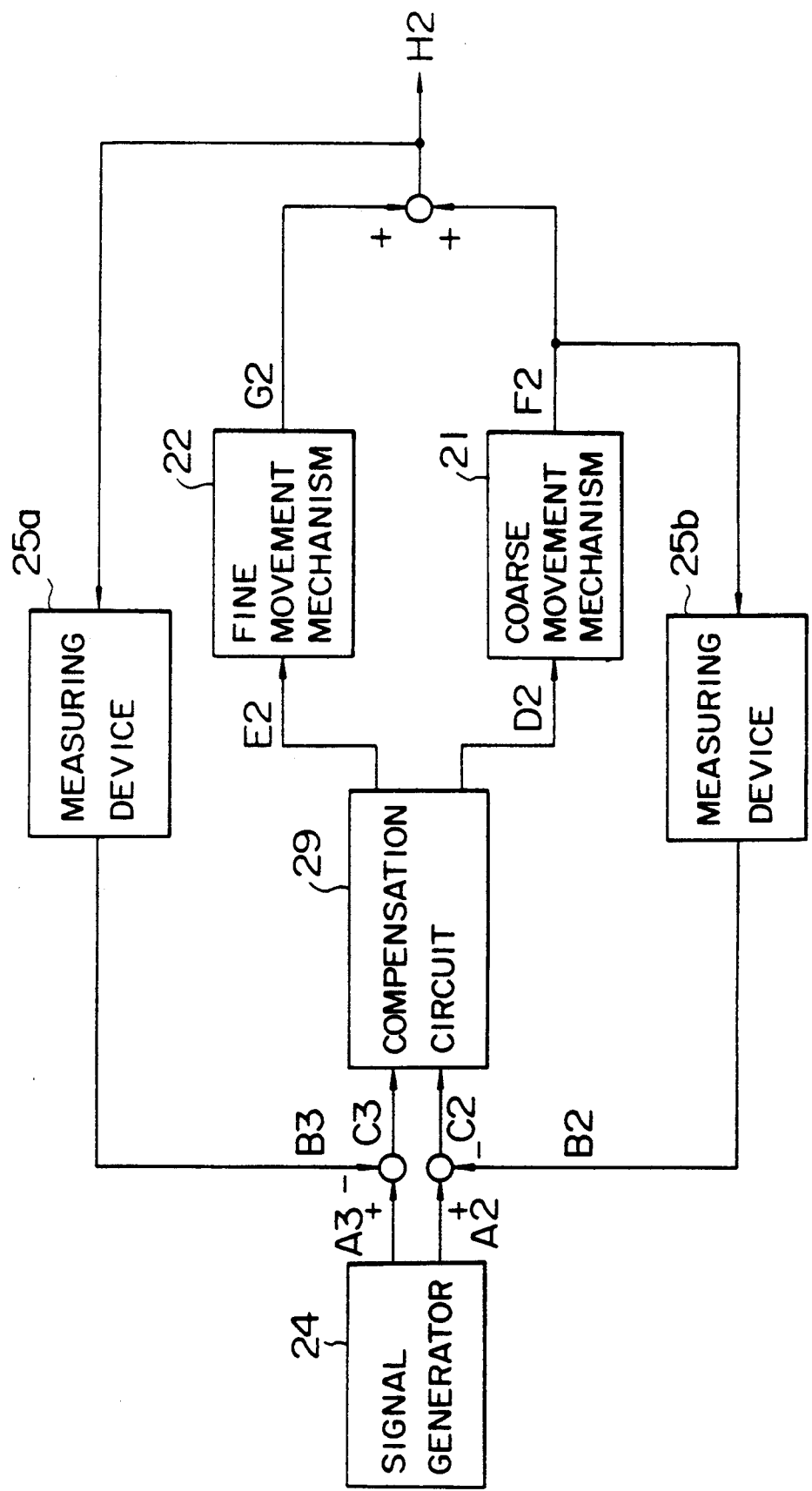
FIG. 10 is a block diagram showing a third conventional positioning control method.
Figure 11:
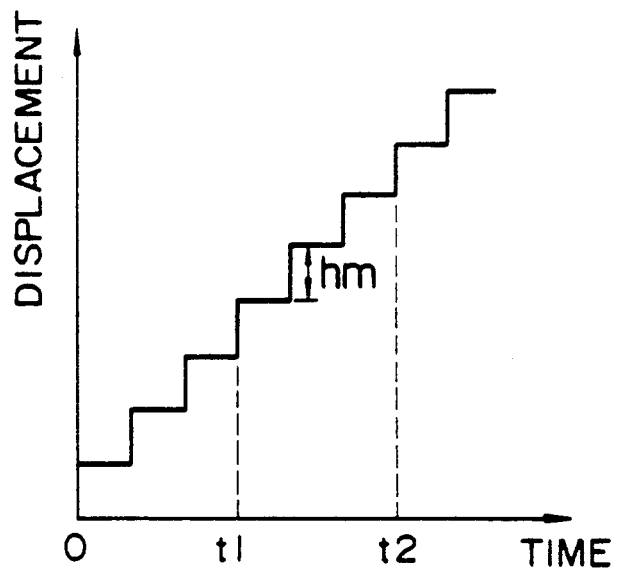
FIG. 11 is a waveform diagram showing a movement command signal to a fine movement mechanism of the control method shown in FIG. 10.
Figure 12:
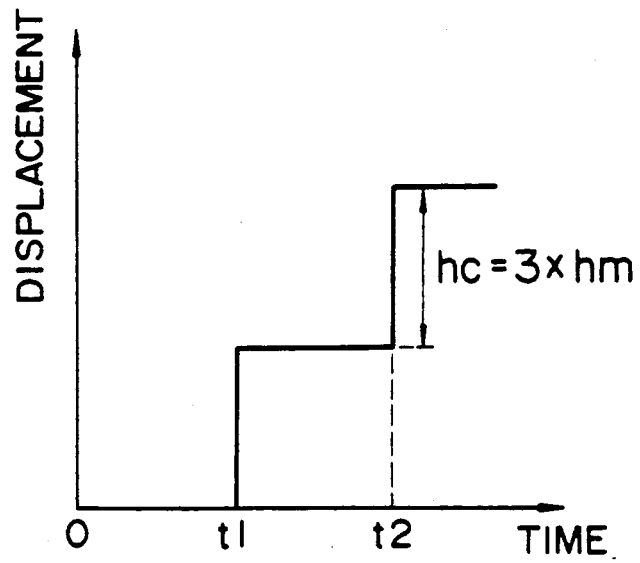
FIG. 12 is a waveform diagram showing a movement command signal to a coarse movement mechanism of the control method shown in FIG. 10.

FIG. 7 shows a movement of the object to be positioned in the case where a stepwise movement command signal A4 of 1 mm is inputted. It is apparent from FIG. 7 that the residual oscillation shown in FIG. 5 is removed and accordingly the transient response can be improved by this embodiment.

As described above in detail in conjunction with the embodiments, according to the present invention, the relative displacement amount of the fine movement mechanism with respect to the coarse movement mechanism is detected by the relative position detecting means and the signal representative of the detected result is added to the difference signal which is a difference of the movement command signal and the displacement signal based on the absolute displacement amount of the object to be positioned with respect to the fixed position, so that the coarse movement mechanism is moved by the signal representative of the added result. Accordingly, movement with high accuracy can always be attained for the continuous positioning control for a large amount of movement requiring high accuracy without exceeding the movable area of the fine movement mechanism. Further, the object to be positioned can be positioned with high accuracy even for the movement command for moving between two points.

We claim:

1. A positioning control method for controlling the position of an object mounted on a fine movement mechanism of a movement apparatus including a fine movement mechanism and a coarse movement mechanism, said coarse movement mechanism having a large amount of movement and low positioning accuracy and said fine movement mechanism having a small amount of movement and high positioning accuracy, comprising:

adding an error signal obtained by subtracting a displacement signal representative of a displacement of the object with respect to a fixed position point of the apparatus from a movement command signal, to a relative displacement of said fine movement mechanism with respect to said coarse movement mechanism to produce a coarse movement command signal, inputting said coarse movement command signal to said coarse movement mechanism, and inputting said error signal to said fine movement mechanism.

2. A positioning control method for controlling a movement apparatus including a coarse movement mechanism which is moved with respect to an apparatus and a fine movement mechanism which is moved with respect to the coarse movement mechanism to position an object on the fine movement mechanism in a wide area with high accuracy, comprising:

generating a movement command for designating a position of the object on the fine movement mechanism by a signal generator;

detecting an absolute displacement of the object on the fine movement mechanism with respect to a fixed point of the apparatus by absolute position detecting means;

detecting a relative displacement of the fine movement mechanism with respect to the coarse movement mechanism by relative position detecting means;

moving the coarse movement mechanism by a difference between an output of the absolute position detecting means and a sum of said movement command from the signal generator and an output of said relative position detecting means; and moving the fine movement mechanism by an error signal obtained by subtracting the output of the absolute position detecting means from the movement command from the signal generator.

3. A positioning controller for controlling the position of an object mounted on a fine movement mechanism of a movement apparatus including a coarse movement mechanism having a large amount of movement and low positioning accuracy and the fine movement mechanism having a small amount of movement and high positioning accuracy, comprising:

a signal generator for generating a movement command signal of the object to be positioned;

absolute position detecting means for detecting an absolute position of the object with respect to a fixed point of the apparatus and emitting a displacement signal representative of a displacement at the time;

relative position detecting means for detecting a relative displacement of the fine movement mechanism with respect to the coarse movement mechanism;

the fine movement mechanism being controlled on the basis of an error signal obtained by subtracting said displacement signal from said movement command signal; and the coarse movement mechanism being controlled on the basis of a coarse movement command signal obtained by adding an output signal of said relative position detecting means to said error signal.

4. A positioning controller for controlling a movement apparatus including a coarse movement mechanism which is moved with respect to a fixed point of the apparatus and a fine movement mechanism which is moved with respect to said coarse movement mechanism for positioning an object on said fine movement mechanism in a wide area with high accuracy, comprising:

a signal generator for generating a movement command for designating a position of said object on said fine movement mechanism;

an absolute position detecting means for detecting an absolute displacement of the object on said fine movement mechanism with respect to a fixed point of the apparatus;

a relative position detecting means for detecting a relative displacement of said fine movement mechanism with respect to said coarse movement mechanism;

a subtracting circuit means for generating an error signal obtained by subtracting an output of said absolute position detecting means from said movement command; and an adder circuit means for adding an output of said relative position detecting means to said error signal, so that said coarse movement mechanism is controlled by an output of said adder circuit means and said fine movement mechanism is controlled by an output of said subtracting circuit means.

* * * * *